(12) United States Patent  
Barnhouse et al.

(10) Patent No.: US 7,216,676 B2  
(45) Date of Patent: May 15, 2007

(54) APPARATUS AND METHOD FOR SHAPING HOSE

(75) Inventors: James P. Barnhouse, Perrysburg, OH (US); George M. Wooley, Grosse Pointe Woods, MI (US); Kevin J. Hartle, Halesowen (GB)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/836,486

(22) Filed: Apr. 30, 2004

(65) Prior Publication Data

US 2005/0241714 A1   Nov. 3, 2005

(51) Int. Cl.  
*F16L 9/14* (2006.01)

(52) U.S. Cl. .................. 138/177; 138/110; 138/172; 138/106; 248/75

(58) Field of Classification Search .......... 138/177, 138/DIG. 8, 106, 103, 110, 172; 248/75; 24/115 A  
See application file for complete search history.

(56) References Cited

U.S. PATENT DOCUMENTS

| | | | |
|---|---|---|---|
| 124,897 A * | 3/1872 | Honsinger | 138/110 |
| 644,858 A * | 3/1900 | Greenfield | 248/65 |
| 955,342 A * | 4/1910 | Maxwell | 137/355.25 |
| 976,987 A * | 11/1910 | Corbridge | 138/106 |
| 1,156,145 A * | 10/1915 | Jenkins | 285/64 |
| 1,445,475 A * | 2/1923 | Berlow | 248/75 |
| 2,147,124 A * | 2/1939 | Litle, Jr. | 251/147 |
| 2,769,999 A * | 11/1956 | Sheahan | 15/327.2 |
| 2,858,590 A * | 11/1958 | Koch | 24/129 B |
| 3,228,474 A * | 1/1966 | Huthsing, Jr. | 169/85 |
| 3,897,923 A * | 8/1975 | Paepke et al. | 248/75 |
| 4,151,864 A * | 5/1979 | Thurman | 138/106 |
| D273,993 S * | 5/1984 | Schulte et al. | D24/128 |
| 4,889,168 A * | 12/1989 | Kerzich et al. | 138/103 |
| 4,928,634 A * | 5/1990 | Voigt | 119/805 |
| D350,201 S * | 8/1994 | Hirsch et al. | D24/128 |
| 5,515,399 A | 5/1996 | Swart | |
| 5,524,327 A * | 6/1996 | Mickel et al. | 24/115 A |

FOREIGN PATENT DOCUMENTS

| | | |
|---|---|---|
| DE | 4415730C1 C1 | 7/1995 |
| DE | EP 0 520 535 | 8/1995 |
| EP | 0 679 554 | 11/1995 |

* cited by examiner

*Primary Examiner*—Patrick Brinson

(57) ABSTRACT

A shaped hose assembly includes a length of hose having an external surface and a hose form including a non-continuous, generally curved wall that extends around the circumference of the external surface of the hose. The wall includes a first axially extending end and a second axially extending end. The hose form also includes at least one bend of predetermined radius. A method for shaping hose is also provided.

12 Claims, 6 Drawing Sheets

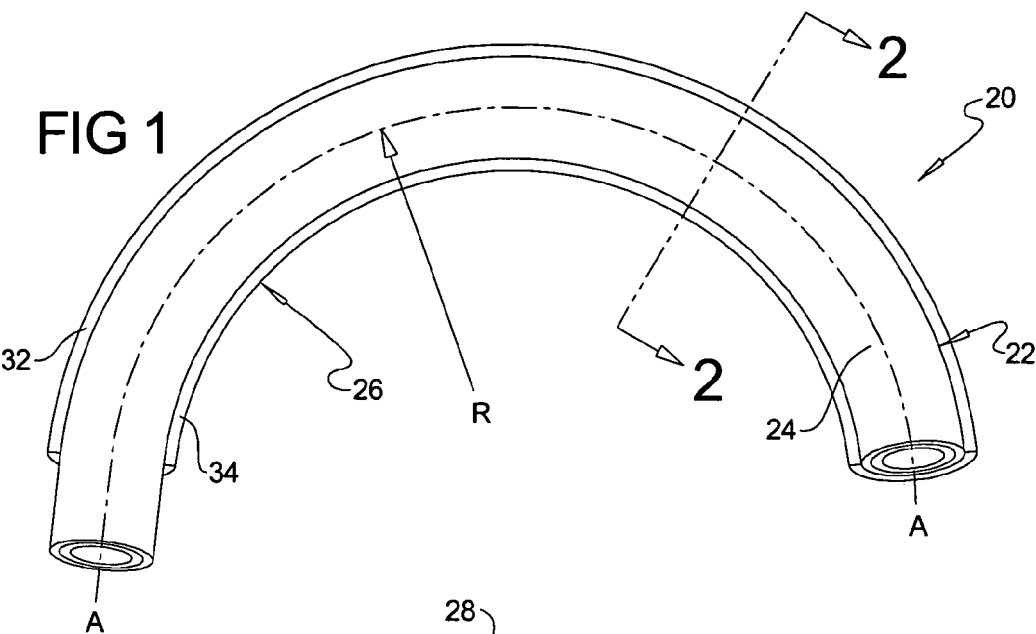
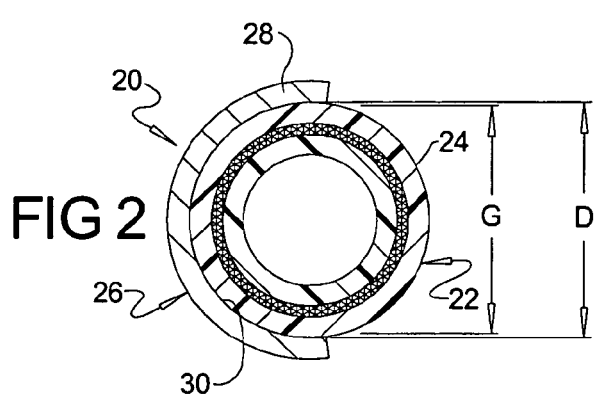
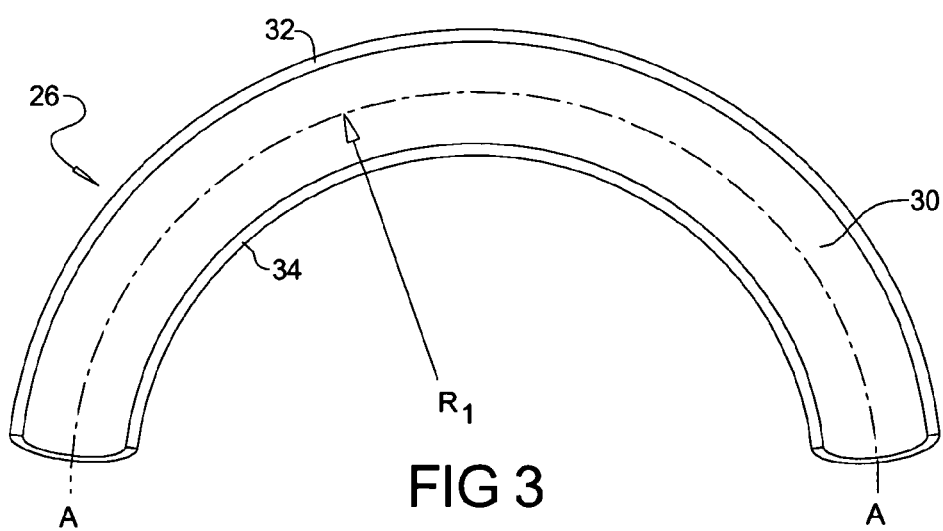

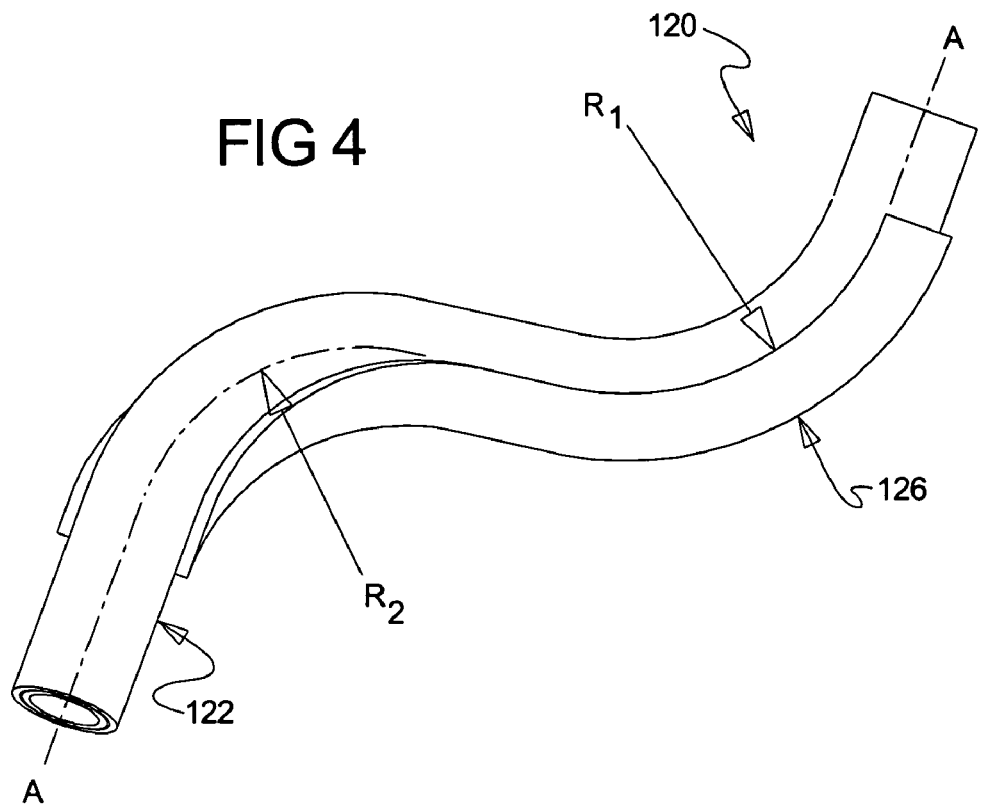
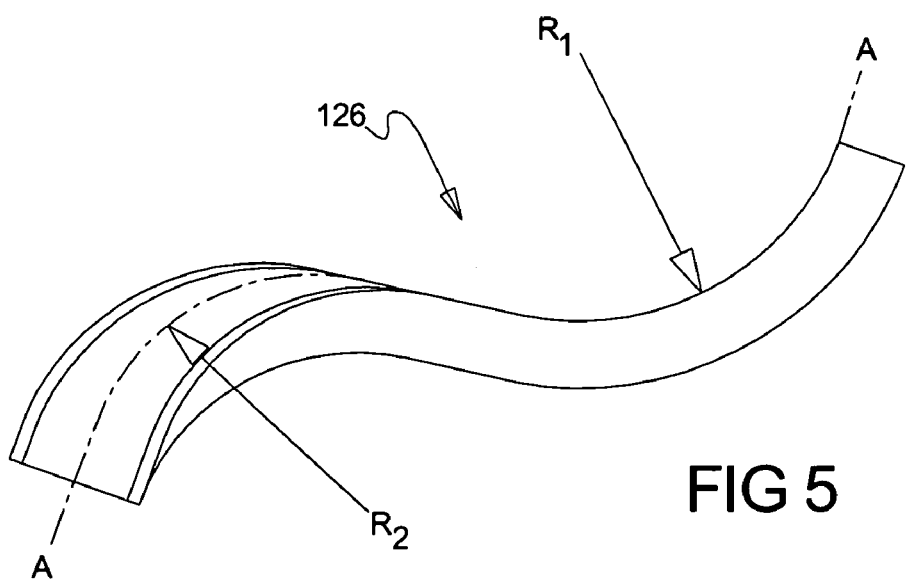

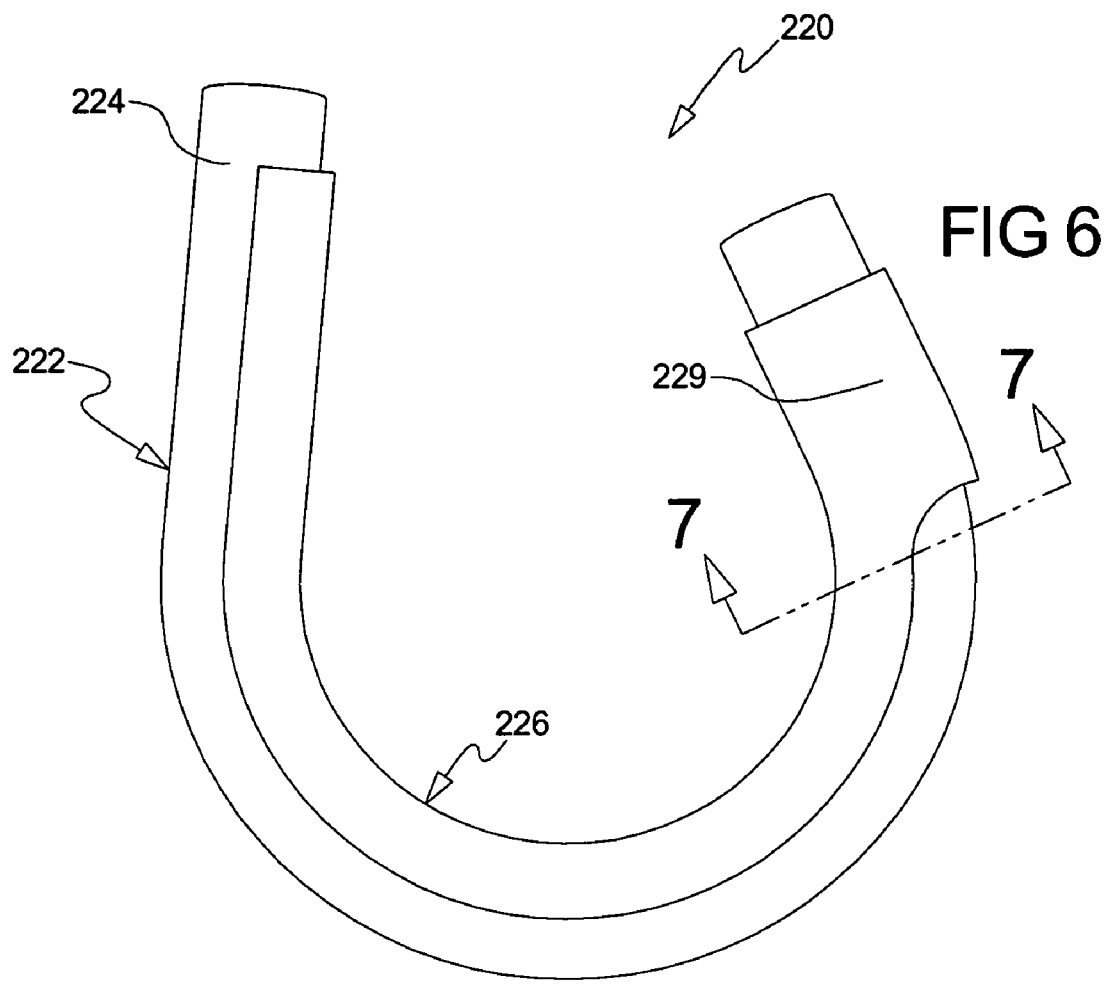
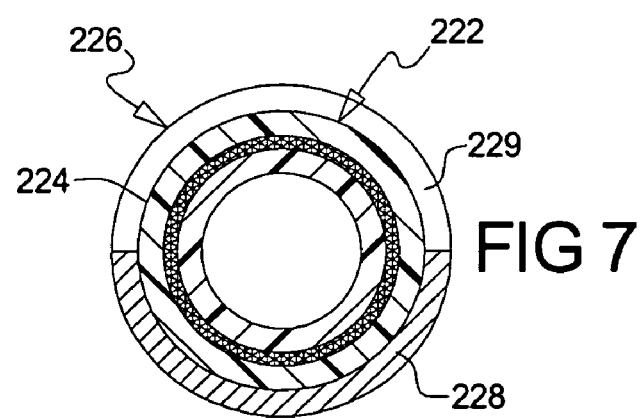

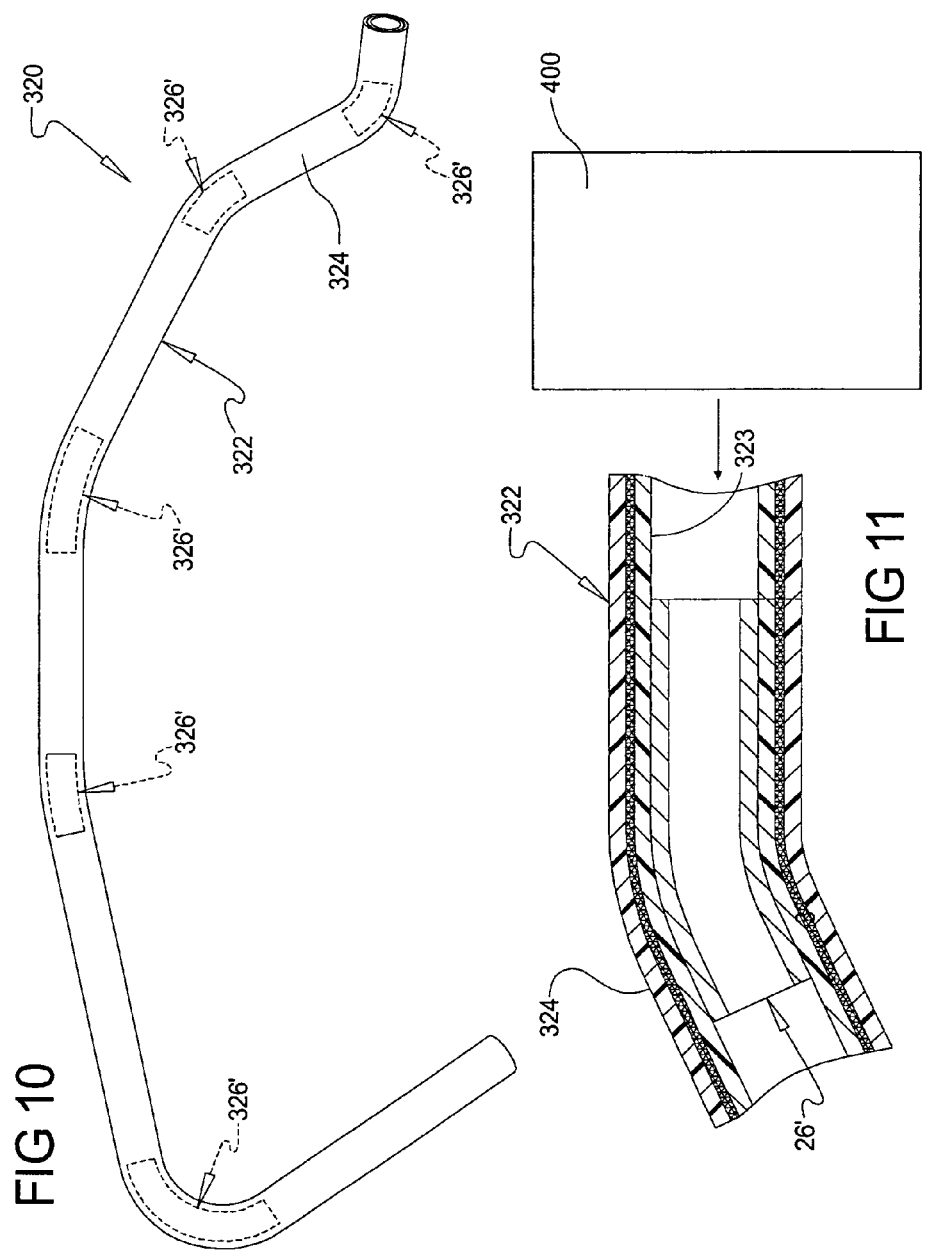

APPARATUS AND METHOD FOR SHAPING HOSE

BACKGROUND OF THE INVENTION

1. Field of the Invention

This invention relates generally to fluid conveying hose assemblies and, more particularly, to an apparatus and method for shaping hose used in fluid conveying hose assemblies.

2. Description of the Related Art

Flexible hose assemblies are often used in engine compartments of motor vehicles to conveying fluids, such as power steering fluid and air-conditioning refrigerants. Unfortunately, in the under-hood design process, routing of the flexible hose is often an afterthought—usually due to its known flexibility—requiring the power-steering and air-conditioning system designers to route the flexible hose around various under-hood components. Accordingly, many under-hood hose assemblies exhibit multiple curves and bends to accommodate the placement of various non-movable engine compartment components.

Hoses may be pre-formed into any desired shape—so-called shaped hose—by curing green hose on a shaping mandrel. In one known hose shaping process, green (uncured) hose is manufactured in relatively long lengths, cut to size, manually placed onto a shaping mandrel, cured on the shaping mandrel, and then manually removed from the mandrel for use. Once removed, the cured hose retains the general shape of the shaping mandrel. Unfortunately, shaping hose using known processes is cost-intensive—particularly when compared to manufacturing non-shaped hose that is typically cured in the same bulk form it is manufactured.

Clearly, there is a need for an improved way of imparting the desired shape in a length of hose without subjecting the hose to known "shaped hose" manufacturing processes.

SUMMARY OF THE INVENTION

A shaped hose assembly is provided that includes a length of hose having an external surface and a hose form. In an embodiment, the hose form includes a non-continuous, generally curved wall that extends around the circumference of the external surface of the hose. The wall includes a first axially extending end and a second axially extending end. The hose form also includes at least one bend of predetermined radius. A method for shaping hose is also provided.

BRIEF DESCRIPTION OF THE DRAWINGS

Embodiments of the invention will now be described, by way of example, with reference to the accompanying drawings, wherein:

FIG. 1 is a perspective view of a hose assembly according to an embodiment of the present invention;

FIG. 2 is a cross-sectional view of the hose assembly shown in FIG. 1 taken along lines 2—2;

FIG. 3 is a perspective view of a hose form used in the hose assembly of FIG. 1;

FIG. 4 is a perspective view of a hose assembly according to another embodiment of the present invention;

FIG. 5 is a perspective view of a hose form used in the hose assembly of FIG. 4;

FIG. 6 is a perspective view of a hose assembly according to another embodiment of the present invention;

FIG. 7 is a cross-sectional view of the hose assembly shown in FIG. 1 taken along lines 7—7;

FIG. 10 is a perspective view of a hose assembly according to another embodiment of the present invention; and FIG. 11 is a detailed view, in partial cross-section, of the hose assembly shown in FIG. 10.

DETAILED DESCRIPTION OF THE INVENTION

Figures 8, 9:
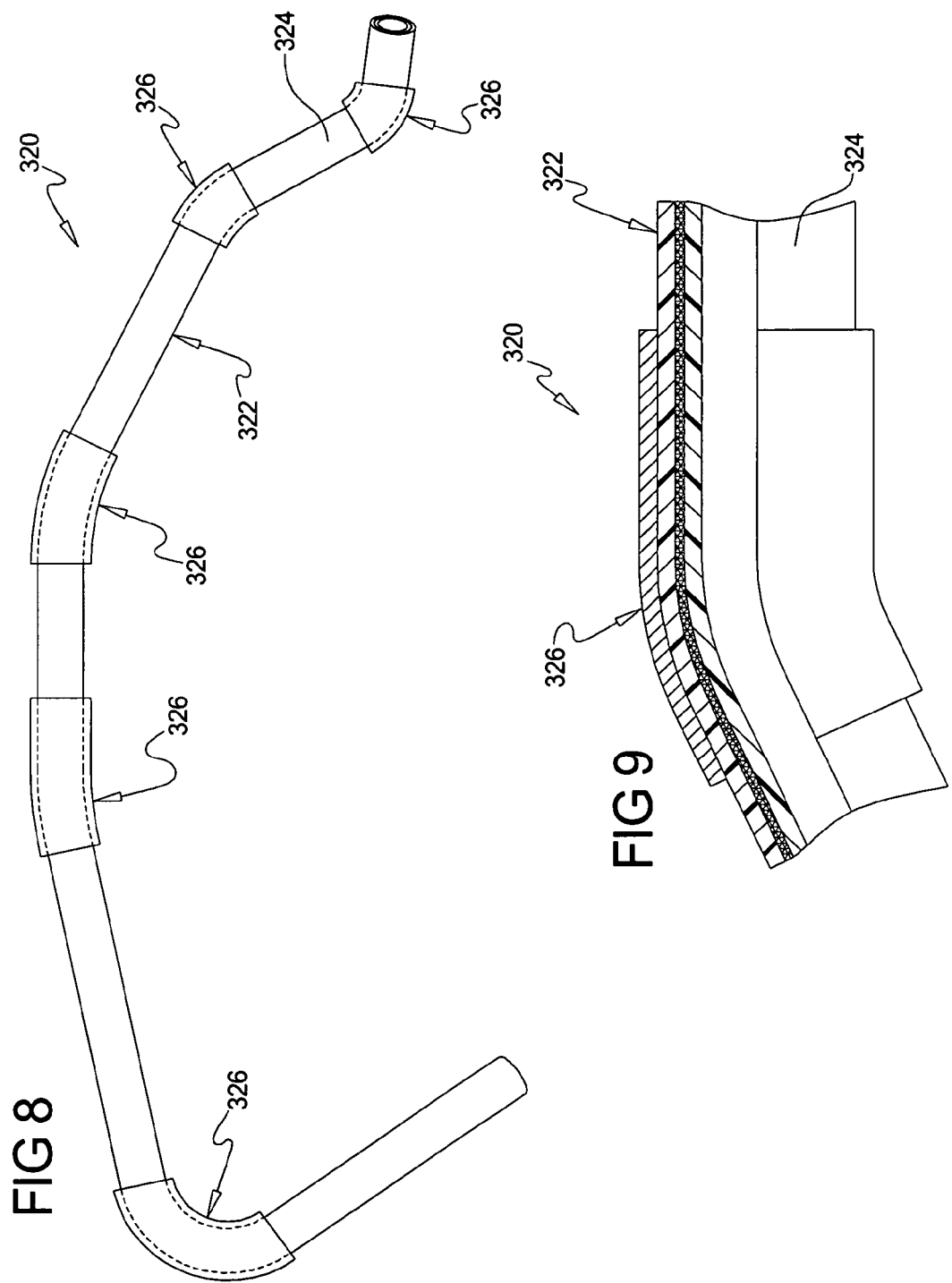
FIG. 8 is a perspective view of a hose assembly according to another embodiment of the present invention.
FIG. 9 is a detailed view, in partial cross-section, of the hose assembly shown in FIG. 8.

Referring to FIGS. 1 and 2, a shaped hose assembly 20 according to an embodiment of the present invention is shown. In the illustrated embodiment, hose assembly 20 includes a length of hose 22 having an external surface 24 and a hose form 26 positioned over at least a portion of external surface 24. The term "hose" includes, without limitation, generally flexible fluid conveying members, such as the flexible rubber hoses used to conveying power steering fluid and air-conditioning refrigerants in the automotive under-hood environment. Hose assembly 20 is shown in FIG. 1 as having an axis A—A that extends through the center of hose assembly 20.

As shown in FIG. 2, hose form 24 includes a non-continuous, generally curved wall 28 that extends around at least a portion of the circumference of external surface 24. When installed on hose 22, an internal surface 30 of hose form 24 may uniformly contact hose 22, as shown in FIG. 2, or may contact hose 22 in any number of locations to impart the desired shape in hose 22.

In an embodiment (shown in FIG. 2), wall 28 extends greater than half-way around the circumference of external surface 24 of hose 22 and includes a first axially extending end 32 and a second axially extending end 34 having a gap G therebetween. As shown in the embodiment of FIG. 2, gap G between the first and second ends 32, 34 is slightly smaller than the diameter D of external surface 24 of hose 22. In this configuration, wall 28 extends sufficiently far around the circumference of external surface 24 to retain hose form 26 on hose 22; however, not so far as to preclude hose form 26 from being assembled onto hose 22 in the radial direction.

The extent to which wall 28 extends around hose 22 may be dependent on a number of factors, including the flexibility of hose 22, the ability of external surface 24 to deform, the flexibility of hose form 26, and the desired method for assembling hose form 26 and hose 22 into hose assembly 20. With regard to the latter factor, hose assembly 20 may be assembled along the axial direction by sliding hose 22 into hose form 26 (or alternatively sliding hose form 26 over hose 22), or by radially assembling hose 22 into hose form 26 (or alternatively radially assembling hose form 26 onto hose 22), such as by radially snapping hose 22 into hose form 26. The term "snapping" is used without limitation to describe the manner in which hose 22 is deformed and hose form 26 is flexed as hose 22 is pushed radially into hose form 26.

To impart the desired shape in hose 22, hose form 26 includes at least one bend of predetermined radius R. For example, in the embodiment shown in FIGS. 1–3, hose form 26 includes a single bend having a radius $R_1$. Hose form 26 is installed on hose 22 such that first end 32 is positioned proximate an outer edge of the bend and second end 34 is positioned proximate an inner edge of the bend. However, the location of ends 32, 34 is not limited to the location shown in FIGS. 1–3. For example, hose form 26 may be installed on hose 22 such that ends 32, 34 are between the inner and outer edge of the bend with gap facing generally upward or downward.

Referring still to FIGS. 1–3, hose form 26 may be made by roll-forming a piece of relatively flat metal, such as aluminum, into the generally "C" shaped, curved structure shown in FIG. 2. Prior to imparting a bend(s) in hose form 26, hose form 26 may be installed onto hose 22 (or hose 22 inserted into hose form 26). Alternatively, hose form 26 may be bent to the desired shape prior to assembling hose assembly 20. In either case, the desired bend(s) may be imparted in hose form 26 using a common tube bender or other device known in the art for bending deformable materials.

As an alternative method of manufacture, hose form 26 may be cast or molded using any number of materials, including without limitation metals and polymers. For example, hose form 26 may be cast into the required shape, including the desired bend(s), using a metal such as aluminum. In another example, hose form 26 may be injection molded from a suitable plastic such as polypropylene.

Referring to FIGS. 4 and 5, a hose assembly 120 according to another embodiment of the present invention is shown. Hose assembly 120 includes a length of hose 122 and a hose form 126 substantially similar to hose form 26 described above with at least one exception, namely, hose form 126 includes a first bend defined by a first radius $R_1$ and a second bend defined by a second radius $R_2$. As also shown in FIGS. 4 and 5, the bends provided in hose form 26 may be created along different planes, resulting in a hose form 26 that exhibits a slight twist in its shape and/or bends in two or more different directions.

Referring to FIGS. 6 and 7, a hose assembly 220 according to another embodiment of the present invention is shown. Hose assembly 220 includes a length of hose 222 having an exterior surface 224 and a hose form 226. Like hose form 26 described above, hose form 226 includes a non-continuous, generally curved wall 228 that extends around at least a portion of the circumference of external surface 224. However, unlike hose form 226 described above, wall 228 need not extend greater than half-way around the circumference of hose 222 to retain hose form 226 on hose 222. Instead, hose form 226 may include at least one retainer 229 positioned proximate at least one end of hose form 226 for grasping hose 222. Retainer 229 may be integral to hose form 226 (as shown in FIG. 6) or may be separate and attached to hose 222 and hose form 226 (not shown). Retainer 226 functions to hold a portion of hose 222 within hose form 226 to achieve the desired shape of hose 222.

Referring to FIGS. 8 and 9, a hose assembly 320 according to another embodiment of the present invention is shown. In the disclosed embodiment, hose assembly includes a length of hose 322 having an external surface 324 and at least one hose form 326. In a particular configuration shown in FIG. 8, hose assembly includes a plurality of hose forms 326, each of which are positioned at a corresponding bend in hose 322. Hose form 326 may be substantially similar to hose form 26 described above with respect to FIGS. 1–3, hose form 126 described above with respect to FIGS. 4 and 5, or hose form 226 described above with respect to FIGS. 6 and 7.

Alternatively, as shown in FIG. 9, hose form 326 may also include a length of deformable tubing, such as aluminum tubing, having an internal diameter that is at least slightly larger than external surface 324 of hose 322 and a length that is longer than the length of the desired bend. In this configuration, each hose form 326 may be formed by sliding each piece of deformable tubing over hose 322 and positioning the tubing proximate the location of the desired bend. The hose and tubing combination may then be placed in a tube bender, or other device known in the art for bending deformable materials, and bent into the desired shape. Once bent, each hose form 326 is held in place by the bend itself and the relatively close dimension between the internal diameter of hose form 326 and the diameter of external surface 324. As shown in FIG. 8, one hose form 326 may be used for each bend in hose 322 or, alternatively, one hose form 326 may be used for more than one bend (not shown).

Another embodiment of the present invention is shown in FIGS. 10 and 11, which includes hose 322 and at least one hose form 326'. The illustrated embodiment is substantially similar to the embodiment shown in FIGS. 8 and 9 with at least one exception, namely, hose form 326' is positioned within an internal bore 323 of hose 322, instead of over external surface 324. Each hose form 326' may be formed by sliding a piece of deformable tubing within hose bore 323 and positioning the tubing proximate the location of the desired bend. The hose and tubing combination may then be placed in a tube bender (illustrated schematically at 400 in FIG. 11), or other device known in the art for bending deformable materials, and bent into the desired shape. Once bent, each hose form 326' is held in place by the bend itself and the close dimension between the external diameter of hose form 326' and the diameter of internal bore 323. As shown in FIG. 10, one hose form 326' may be used for each bend in hose 322 or, alternatively, one hose form 326' may be used for more than one bend (not shown).

Figure 12:
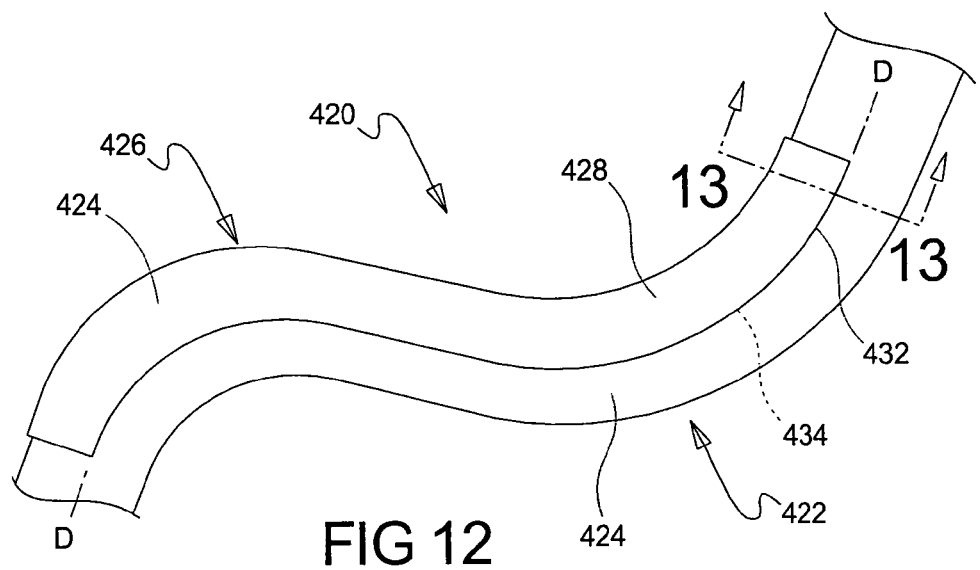
FIG. 12 is a perspective view of an embodiment of a hose assembly.
Figure 13:
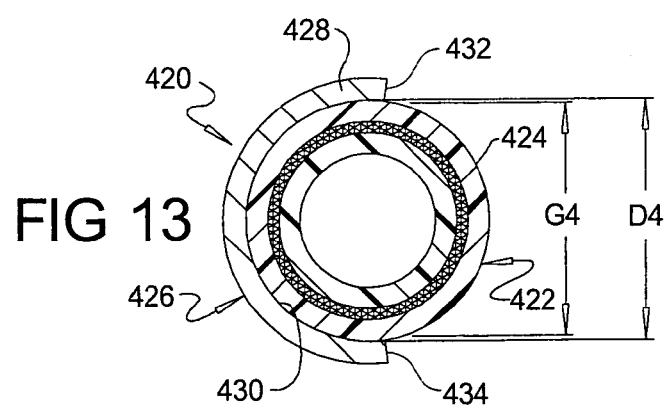
FIG. 13 is a sectional view of the hose assembly of FIG. 12, taken along line 13—13.

Referring to FIGS. 12 and 13, a shaped hose assembly 420, as mentioned earlier, is shown. In the illustrated embodiment, hose assembly 420 includes a length of hose 422 having an external surface 424 and a hose form 426 positioned over at least a portion of external surface 424. The term "hose" includes, without limitation, generally flexible fluid conveying members, such as the flexible rubber hoses used to conveying power steering fluid and air-conditioning refrigerants in the automotive under-hood environment. Hose assembly 420 is shown in FIG. 12 as having an axis D—D that extends through the center of hose assembly 420.

As shown in FIG. 13, hose form 424 further includes a non-continuous, generally curved wall 428 that extends around at least a portion of the circumference of external surface 424. When installed on hose 422, an internal surface 430 of hose form 426 may uniformly contact hose 422, as shown in FIG. 13, or may contact hose 422 in any number of locations to impart the desired shape in hose 422. Wall 428 extends greater than half-way around the circumference of external surface 424 of hose 422 and includes a first axially extending end 432 and a second axially extending end 434 having a gap G4 therebetween. As shown in the embodiment of FIG. 13, gap G4 between the first and second ends 432, 434 is slightly smaller than the diameter D4 of external surface 424 of hose 422. In this configuration, wall 428 extends sufficiently far around the circumference of external surface 424 to retain hose form 426 on hose 422; however, not so far as to preclude hose form 426 from being assembled onto hose 422 in the radial direction. Hose assembly 420 is substantially similar to hose form 26 described above with at least one exception, namely, hose form 426 includes a first bend defined by a first radius R3 and a second bend defined by a second radius R4.

As will be appreciated, the present invention allows a length of hose to be "shaped" without employing traditional and costly hose shaping processes, such as manufacturing green hose in relatively long lengths, cutting the green hose to size, manually placing the cut green hose onto shaping mandrel, curing the green hose on the mandrel, and then manually removing the shaped hose from the mandrel for use. In contrast, the present invention allows hose to be made in more traditional and cost effective bulk manufacturing methods and then "shaped" using the hose forms described above.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What claimed is:

1. A shaped hose assembly, comprising:
   a length of hose having an external surface; and
   a hose form including a non-continuous, generally curved wall that extends around the circumference of the external surface of the hose, a single retainer portion extending from the curved wall, and at least one bend of predetermined radius, wherein the single retainer portion radially retains at least a portion of the hose within the single retainer portion, wherein the hose form includes at least two bends of predetermined radius, and wherein said curved wall extends in a generally continuous radial orientation relative to the axis of the hose assembly along an axial length of said hose form.

2. The assembly of claim 1, wherein the generally curved, non-continuous wall extends greater than half-way around the circumference of the external surface of the hose.

3. The assembly of claim 1, wherein the generally curved, non-continuous wall includes a first axially extending end and a second axially extending end, wherein a gap between the first and second ends is less than a diameter of the external surface of the hose.

4. The assembly of claim 3, wherein the first and second axially extending ends are positioned between an inner edge and an outer edge of the bend.

5. The assembly of claim 1, wherein the retainer portion encircles the hose.

6. The assembly of claim 1, wherein the retainer portion is positioned adjacent an end of the hose form.

7. A method for shaping hose, comprising:
   providing a predetermined length of hose and a predetermined length of tubing having an internal diameter larger than an external diameter of the hose; thereafter
   placing the tubing over the hose at a desired location, wherein at least a portion of the tubing encircles the hose at a predetermined axial location along the hose; and thereafter
   bending the tubing to impart a desired shape in the hose, wherein the step of bending the tubing includes the step of bending the tubing with a tube bender.

8. The method of claim 7, wherein the providing step is further defined by providing a length of tubing having an internal diameter that is slightly larger than the external diameter of the hose.

9. The method of claim 7, wherein the providing step is further defined by providing a length of tubing that is longer than a length of the desired shape.

10. The method of claim 7, wherein the providing step is further defined by providing tubing of sufficient length to cover at least two bends in the hose.

11. The method of claim 7, wherein the desired shape is defined, at least in part, by two distinct radii of curvature.

12. The method of claim 7, wherein the step of providing further comprises providing a generally straight length of tubing.

* * * * *